United States Patent [19]

Roberts

[11] 3,969,716

[45] July 13, 1976

[54] GENERATION OF DOT MATRIX CHARACTERS ON A TELEVISION DISPLAY

[75] Inventor: Alan Roberts, Sutton, England

[73] Assignee: British Broadcasting Corporation, London, England

[22] Filed: July 10, 1974

[21] Appl. No.: 487,124

[52] U.S. Cl. ........................ 340/324 AD; 178/7.5 D

[51] Int. Cl.$^2$ ............................................ G06F 3/14

[58] Field of Search ............................. 340/324 AD

[56] References Cited

UNITED STATES PATENTS

| | | | |
|---|---|---|---|
| 3,573,789 | 4/1971 | Sharp et al. | 340/324 R |
| 3,609,743 | 9/1971 | Lasoff et al. | 340/324 AD |
| 3,680,076 | 7/1972 | Duffek et al. | 340/324 AD |
| 3,697,976 | 10/1972 | Fenton | 340/324 AD |
| 3,774,161 | 11/1973 | Chambers | 340/324 AD |
| 3,792,464 | 2/1974 | Hamada et al. | 340/324 AD |
| 3,803,583 | 4/1974 | Manber | 340/324 AD |
| 3,812,491 | 5/1974 | Barraclough et al. | 340/324 AD |
| 3,878,536 | 4/1975 | Gilliam | 340/324 AD |

*Primary Examiner*—David L. Trafton
*Attorney, Agent, or Firm*—Robert F. O'Connell

[57] ABSTRACT

Dot matrix characters are rounded by interpolating quarter dots in the angles of diagonal strokes with the feature that the video signal is a line interlaced signal; the diagonals are detected as predetermined logical combinations of an undelayed signal, a dot-delayed signal, a line delayed signal and a line-plus-dot delayed signal; the quarter dots are interpolated in real time as the diagonals are detected but are interpolated in a first one of the said signals in first fields and in a second one of the said signals in the second, interlaced fields, the second signal being line-delayed relative to the first signal.

3 Claims, 8 Drawing Figures

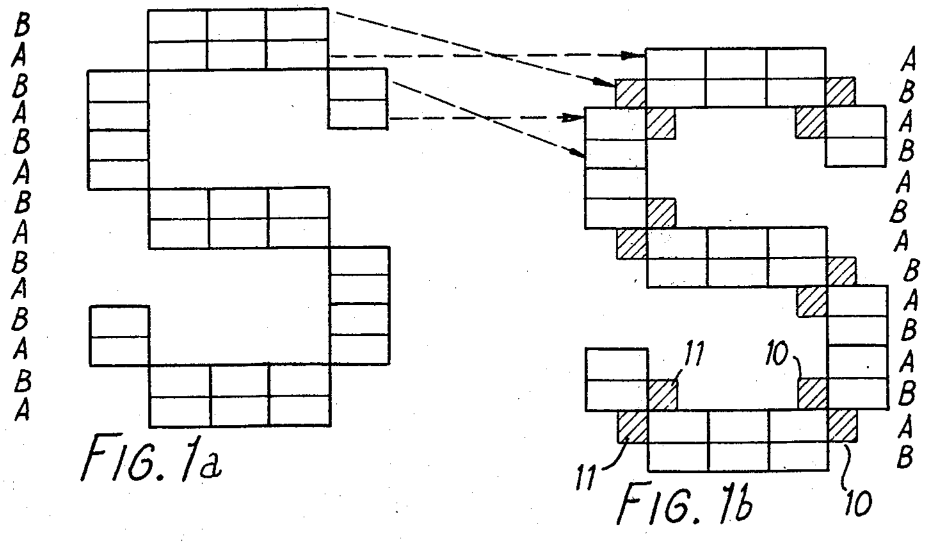
FIG. 1a
FIG. 1b
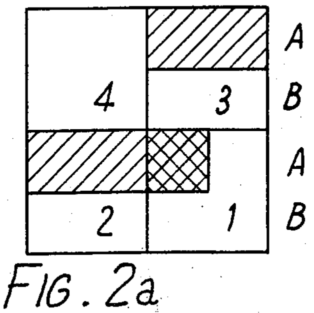
FIG. 2a
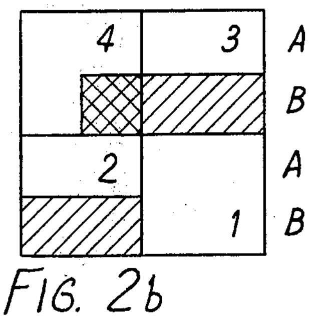
FIG. 2b
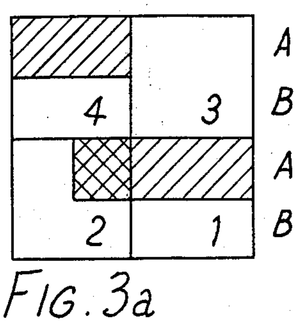
FIG. 3a
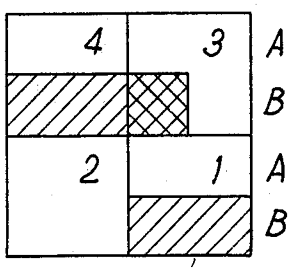
FIG. 3b

GENERATION OF DOT MATRIX CHARACTERS ON A TELEVISION DISPLAY

This invention relates to the generation of dot matrix characters on a television display. This technique is well known and employs a decoding circuit adapted to create a pulse in each of the cells of a matrix of cells (dot matrix) required to build up the selected character. A commonly used matrix is the 7 × 5 matrix with 7 rows and 5 columns of cells, which are typically square, but need not be.

A defect of dot matrix characters is that, although vertical and horizontal strokes can be correctly drawn to the full width or height of a cell, diagonal parts of the characters have coarsely serrated edges and their mean width is only $1/\sqrt{2}$ times the mean width of the horizontal and vertical strokes (assuming the cells to be square), leading to a reduction in brightness of about 30%. This defect is visually noticeable.

It is known to remedy this defect by an interpolation procedure, wherein the corner-wise opposed quarters of the cells to either side of a diagonal portion are filled in. This procedure is feasible because each cell actually consists of segments of two scanning lines; a quarter cell is filled in by a pulse in one line only and of half the duration of a pulse corresponding to a complete segment, this duration being referred to as a dot period. Known interpolation procedures are restricted to sequentially scanned displays, such as are used in data display equipment. The object of this invention is to provide apparatus usable with an interlaced scan, thereby enabling improved dot matrix characters to be displayed on monitors or receivers operating to broadcast television standards.

According to the invention there is provided interpolation apparatus responsive to a line- interlaced video signal having first fields alternating with second fields and representing a dot matrix character in a matrix of cells, each composed of segments of two lines adjacent each other in the interlaced picture, to establish four signals of which three are delayed by one dot period, by one line period, and by one line period plus one dot period respectively relative to the fourth signal, a logic circuit responsive to the four signals to detect diagonal portions of the character, and means controlled by the logic circuit to add half-dot period pulses in lines of the first fields and in lines of the second fields delayed by a line period, so as to fill in cornerwise opposed quarters of the cells to either side of a diagonal portion in the display of the character represented by the first fields and the line delayed second fields.

As will appear subsequently, the line delay applied to the second fields enables the interpolation to be effected in both the first and second fields in real time referred to the said fourth signal.

Two embodiments of the invention will now be described, by way of example, with reference to the accompanying drawings, in which:

FIG. 1(a) shows a letter "S" in a 7 × 5 dot matrix;

FIG. 1(b) shows the same letter with odd lines delayed by one line period and with quarter cell interpolation components added to improve the display;

FIG. 2(a) shows a right diagonal (sloping upwardly to the right) during an even field;

FIG. 2(b) shows a right diagonal during an odd field;

FIG. 3(a) shows a left diagonal during an even field;

FIG. 3(b) shows a left diagonal during an odd field;

Figure 4:
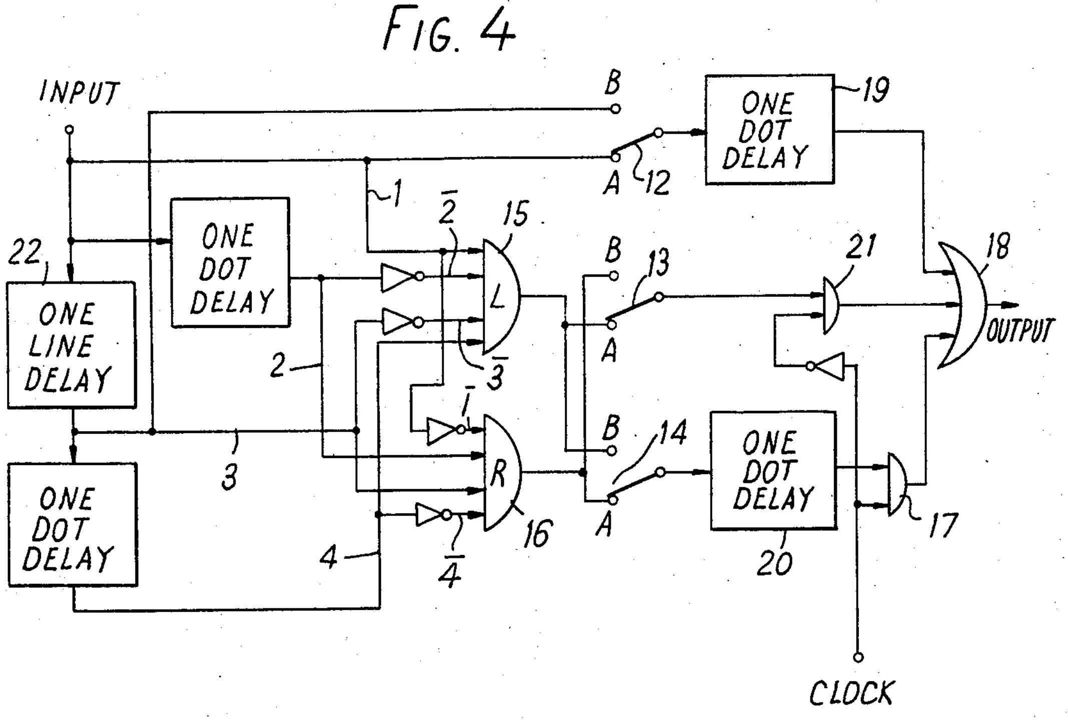
FIG. 4 is a block diagram of the first embodiment of the invention.

In FIGS. 1(a) and (b), heavy lines outline the dot cells, divided horizontally by lighter lines into segments pertaining to A (even) and B (odd) fields respectively. FIG. 1 (b) demonstrates that, provided in the original signal (FIG. 1(a)) the B lines precede the A lines in each cell, i.e. are above the A lines, the character is not distorted if the B lines are delayed by one line; the character is merely displaced downwardly by half the line pitch in a field.

In FIG. 1(b) the quarter cells, shown shaded, are necessary to improve the representation of the diagonal portions. Quarter cells 10, for example, are corner-wise opposed at a right diagonal while quarter cells 11 are cornerwise opposed at a left diagonal.

A right diagonal of FIG. 1(b) is analysed more closely in FIGS. 2(a) and (b). Four cells defining the diagonal are labelled 1 to 4. The segments which appear are hatched and the quarter cells to be added are cross hatched. The relative delays are as follows:

Cell 1 : undelayed (the abovementioned "fourth signal");

Cell 2 : delayed by dot period;

Cell 3 : delayed by line period;

Cell 4 : delayed by line period plus dot period.

It can also be seen that the following logical conditions define a right diagonal:

Cell 1 : pulse absent;

Cell 2 : pulse present;

Cell 3 : pulse present;

Cell 4 : pulse absent.

Similarly, from FIGS. 3(a) and (b) a left diagonal is defined by:

Cell 1 : pulse present;

Cell 2 : pulse absent;

Cell 3 : pulse absent;

Cell 4 : pulse present.

Also, from FIGS. 2(a) and (b), detection of a right diagonal requires the addition of a quarter cell in cell 1 (the real time cell) in an A field and in cell 4 in a B field. From FIGS. 3(a) and (b), detection of a left diagonal requires the addition of a quarter cell in cells 2 and 3.

One circuit complying with the above requirements is shown in FIG. 4. Lines 1 to 4 carry the signals for cells 1 to 4 as defined above and lines $\bar{1}$ to $\bar{4}$ carry these signals inverted, AND gates 15 and 16 detect the left and right diagonals respectively, in accordance with the foregoing logical conditions. Since the actions required in A and B fields differ, three changeover switches 12, 13 and 14 are employed and are switched synchronously at field frequency.

Consider first FIG. 2(a), field A of a right diagonal, requiring a quarter dot to be inserted in the first half segment of cell 1. In FIG. 4 this requirement is met by the output of gate 16 (right diagonal) enabling an AND gate 17 which passes a square-wave clock signal whose period equals the dot period and which is true during the first half of this period. The quarter dot pulse thereby created is added to the main signal by an OR gate 18. A one dot delay 19 is required in the main signal path, for a reason which will appear subsequently. Another one dot delay 20 between the switch 14 and the gate 17 compensates for the effect of the delay 19.

FIG. 2(b) shows that, in field B of a right diagonal, a quarter cell is to be added in the latter half of the segment of cell 4. This (FIG. 4) the output of gate 16 enables a gate 21 via switch 13 in field B and gate 21 passes the inverted clock signal (which is true in the latter half of a dot period). There is no delay between switch 13 and gate 21, but the switch 12 now selects the output of the one line delay 22 (signal 3) and the main signal at gate 18 has a total delay of one line period plus one dot period and the signal from gate 21 therefore puts the quarter dot in cell 4, as required.

Conditions for a left diagonal may be tabulated more summarily:

Field A, FIG. 3(a): Gate 15 enables gate 21 via switch 13, putting quarter dot in latter half of cell 2 because only delay 19 is effective in the main path.

Field B, FIG. 3(b): Gate 16 enables gate 17 via switch 14, putting quarter dot in first half of cell 3 because delays 22 and 19 are in the main path but delay 20 cancels the effect of delay 19.

Figure 5:
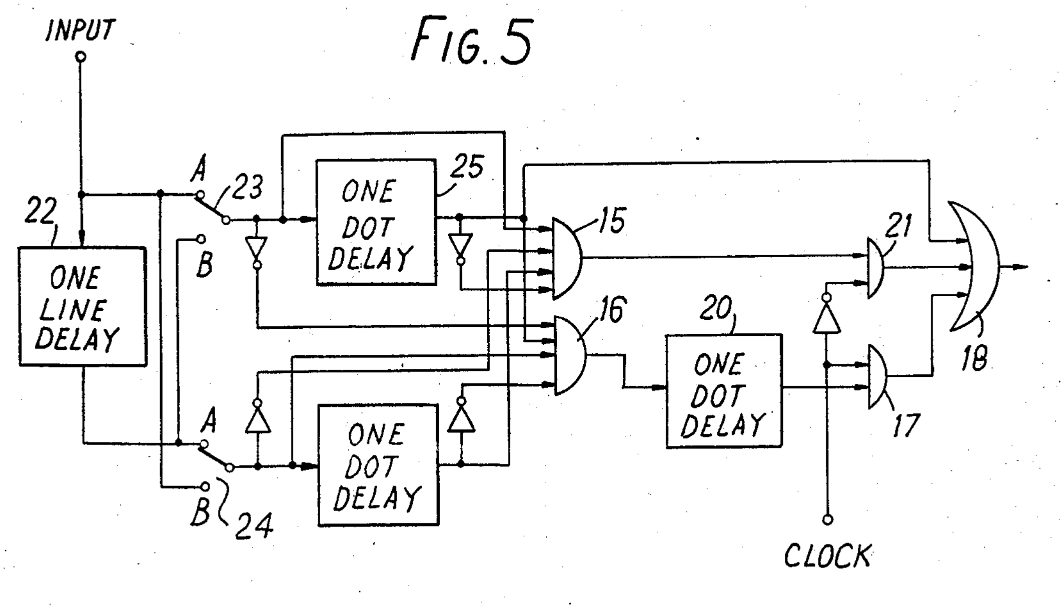
FIG. 5 is a block diagram of the second embodiment.

It can be seen that, in field A, gates 15 and 16 command a quarter dot in the first and second halves of a segment respectively, whereas in field B, gates 15 and 16 command a quarter dot in the second and first halves respectively; hence the need for switches 13 and 14. These switches may be removed if switching is placed on the input side of the detector gates so that, in field A, gates 15 and 16 are respectively left and right diagonal detectors, whereas in field B, gates 15 and 16 are respectively right and left diagonal detectors. It turns out that this leads to a simplification in that the switch 12 and the delay 19 are no longer required. The circuit is shown in FIG. 5 with just two switches 23 and 24. It can be seen from the circuit that the inputs to the gates 15 and 16 are as follows:

Gate 15, field A : $1\ \bar{2}\ \bar{3}\ 4$ = left diagonal;
Gate 15, field B : $\bar{1}\ 2\ 3\ \bar{4}$ = right diagonal
Gate 16, field A : $\bar{1}\ 2\ 3\ \bar{4}$ = right diagonal;
Gate 16, field B : $1\ \bar{2}\ \bar{3}\ 4$ = left diagonal.

One of the one dot delays, delay 25, used (as in FIG. 4) in creating the inputs to the detector gates, and the corresponding switch 23, now also provide the function of switch 12 and delay 19 in FIG. 4.

What is claimed is:

1. Interpolation apparatus responsive to a line-interlaced video signal having first fields alternating with second fields and representing a dot matrix character in a matrix of cells, each composed of segments of two lines adjacent each other in the interlaced picture, said apparatus comprising delay means operative to establish four signals, of which three are delayed by one dot period, by one line period, and by one line period plus one dot period respectively relative to the fourth signal, a logic circuit responsive to predetermined logical combinations of said four signals to detect diagonal portions of the character, and means controlled by the logic circuit to add half-dot period pulses in lines of the first fields and in lines of the second fields delayed by a line period, so as to fill in cornerwise opposed quarters of the cells to either side of a diagonal portion in the display of the character represented by the first fields and the line delayed second fields.

2. Apparatus according to claim 1, wherein the logic circuit comprises two gates arranged to detect the conditions $\bar{1}$, 2, 3, $\bar{4}$ and 1, $\bar{2}$, $\bar{3}$, 4 indicative of right and left diagonals, where 1, 2, 3, 4 represent the four signals in order of increasing delay, switching means arranged to feed to a signal adding circuit a first one of the four signals during each first field and a second one of the four signals during each second field, the second signal being delayed by one line period relative to the first signal, and a logical circuit responsive to the outputs of the two gates to gate selectively half-dot period clock pulses corresponding to the left and right halves of a cell to the signal adding circuit, and wherein the switching means further control the operation of the gates on the logical circuit so that:

a. detection of $\bar{1}$, 2, 3, $\bar{4}$ in a first field gates a left-of-cell clock pulse into the first signal,
b. detection of $\bar{1}$, 2, 3, $\bar{4}$ in a second field gates a right-of-cell clock pulse into the second signal with a delay of one dot,
c. detection of 1, $\bar{2}$, $\bar{3}$, 4 in a first field gates a right-of-cell clock pulse into the first signal with a delay of one dot,
d. detection of 1, $\bar{2}$, $\bar{3}$, 4 in a second field gates a left-of-cell clock pulse into the second signal.

3. Apparatus according to claim 2, wherein the switching means precede the two gates and cause one of the gates to detect the conditions $\bar{1}$, 2, 3, $\bar{4}$ and 1, $\bar{2}$, $\bar{3}$, 4 in the first and second fields respectively and cause the other one of the gates to detect the conditions $\bar{1}$, 2, 3, $\bar{4}$ and 1, $\bar{2}$, $\bar{3}$, 4 in the second and first fields respectively.

* * * * *